3,305,091
METHOD OF SEPARATING LIQUID-SOLID SUSPENSIONS INTO INDIVIDUAL PHASES
George A. Brady, Schuylkill Haven, and Harold H. Griffiths, Cressona, Pa., assignors to the United States of America as represented by the Secretary of the Interior
Filed Apr. 20, 1965, Ser. No. 449,657
4 Claims. (Cl. 210—65)

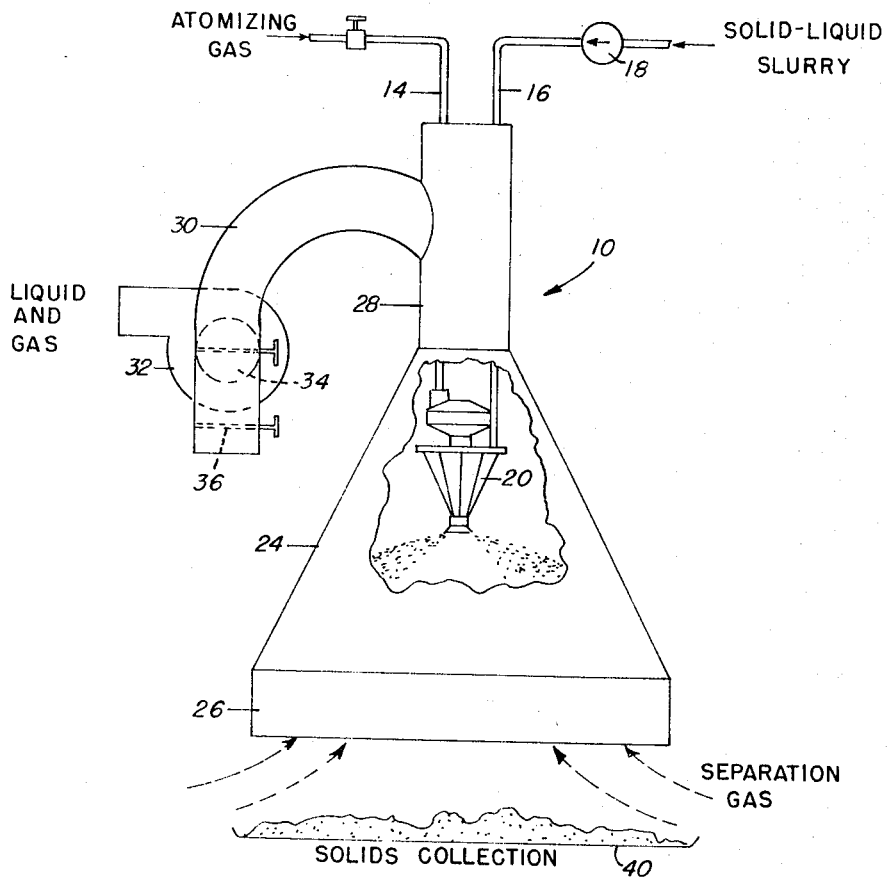

The invention herein described and claimed may be manufactured and used by or for the Government of the United States of America for governmental purposes without the payment of royalties thereon or therefor.

This invention relates to a novel method for separating mixtures of liquids and solids into individual phases. The system is particularly concerned with the dewatering of coal by feeding a solid-liquid slurry to an atomizing device operated so as to convert the water into droplets smaller than the coal particles and injecting the coal and fine water particles into a gaseous separating stream, such as air.

Prior to this invention, the separation of a solid from a slurry was normally accomplished by a two-stage process consisting of a first coarse separation of the liquid by gravity settling, drainage, filtration or centrifugation, followed by a second treatment in which additional liquid was removed by evaporation with the use of thermal energy. The complexities introduced by the necessity for using two stages were further complicated in the instance of heat-sensitive solids. Therefore, the advantages of a simple one-step method which can be used without supplying the latent heat of evaporation become apparent.

Accordingly, it is an object of this invention to present a novel process for economically separating solids and liquids from mixtures of the two. It is a further object of the present invention to disclose a dewatering system for coal slurries. These and other objects and features of the present invention will be apparent from the following description thereof wherein reference is made to the drawing in which a schematic representation of the novel process and the apparatus for its operation is shown.

The separating apparatus 10 comprises a source of atomizing gas such as line 14 and a source of solid-liquid slurry such as line 16 having a variable delivery pump 18 located therein. These lines terminate in an atomizer means 20. The mixture of solids and liquid is sprayed into a conical shell chamber 24 having a lower intake portion 26 and an upper throat section 28. Leading from the throat section 28 is a fan intake conduit 30 connected to a blower fan 32. In order to control the separating gas flow rate, side damper 34 and bottom damper 36 are provided. The suction of the blower fan 32 induces gas flow at the lower intake portion of the conical spray chamber. Located below the intake 26 is a collection pan 40, which may be manually emptied or equipped with an automatic conveyor to withdraw the solids from the system.

The separation of the two phases of a slurry is accomplished by converting the liquid to a mist with particle sizes small enough to permit its separation from the solid particles by gas entrainment. The equipment and procedures used in converting a liquid to finely divided mist by centrifugal and bifluid spray-nozzle atomization are well known to those skilled in the art of conducting spray-drying operations in which the liquid is atomized into small particles to facilitate evaporation of the liquid by increasing the exposed surface area. Typical examples of such atomizers are disclosed in United States Patents 2,199,015, 2,413,420, and 3,074,856. The atomizer preferred for this invention is a standard centrifugal atomizer identified as Model AT–2 supplied by Bowen Engineering Company.

Atomization can be accomplished by types of sprayers other than the centrifugal type; for instance the liquid may be converted to a mist by bifluid atomizers, sonic vibrators, and combinations of the various types.

Many alternative arrangements of the elements can be used without departing from the spirit of the invention. Relative directions of the spray and the separating gas can be parallel, countercurrent, or at an intermediate angle. The creation of any combination of conditions which causes or permits differences in the direction of movement of the two types of particles is within the scope of the invention.

Variables which influence performance include (1) density and particle size of mist droplets generated from liquid, (2) density and particle size of solid, (3) velocity and flow direction of gas used as the separating medium, and (4) concentration of mist in the separating medium.

Results from typical tests on slurry made with anthracites of three different particle sizes are given in Table 1.

TABLE 1.—EXPERIMENTAL DATA ON MECHANICAL SEPARATION OF ANTHRACITE-WATER SLURRY

| Particle of size of solid | Recovery of anthracite in feed, percent | Moisture content of anthracite recovered, percent | Relative humidity of entering air, percent |
|---|---|---|---|
| Minus 60 x 0 mesh | 75.3 | 9.2 | 90 |
| Minus 60 x 140 mesh | 97.5 | 8.3 | 75 |
| Minus 140 x 270 mesh | 85.0 | 9.6 | 85 |

Typical results from screen analyses on the three sizes of feed coal referred to in Table 1 are as follows. (Tabulated as weight percent.)

TABLE 2

| Mesh size | Minus 60 x 0 mesh | Minus 60 x 140 mesh | Minus 140 x 270 mesh |
|---|---|---|---|
| Through 60 on 80 | 10.3 | 19.8 | |
| Through 80 on 100 | 12.8 | 27.8 | |
| Through 100 on 140 | 19.5 | 47.3 | |
| Through 140 on 200 | 15.4 | 5.1 | |
| Through 200 on 270 | 14.4 | | 56.4 |
| Through 270 on 325 | 7.4 | | 43.4 |
| Through 325 | 20.2 | | 0.2 |

The points represented in Table 3 are in a horizontal plane through the spray chamber. The plane is located one-half inch below the atomizer, where the diameter of the conical spray chamber is 30 inches.

Linear velocities measured at the indicated points are as follows:

TABLE 3

| Distance from center of spray chamber, inches | Average velocity, feet per minute | | |
|---|---|---|---|
| | Both dampers open | Side damper open, bottom damper closed | Both dampers closed |
| 1 | 65 | 85 | 120 |
| 3 | 60 | 80 | 120 |
| 5 | 60 | 75 | 120 |
| 7 | 60 | 75 | 110 |
| 9 | 50 | 70 | 105 |
| 11 | 45 | 55 | 90 |
| 13 | 35 | 40 | 60 |
| 15 | 40 | 40 | 50 |

Table 4 contains results from experiments on separating anthracite from a suspension consisting of 60 percent water and 40 percent anthracite with equipment assembled to accomplish the separation by an upwardly flowing air stream and also by a downwardly flowing air stream.

TABLE 4.—EXPERIMENTAL DATA ON MECHANICAL SEPARATION OF ANTHRACITE-WATER SLURRIES

| Particle size of solid | Direction of air flow | | | |
|---|---|---|---|---|
| | Upward | | Downward | |
| | Recovery of anthracite in feed, percent | Moisture content of anthracite recovered, percent | Recovery of anthracite in feed, percent | Moisture content of anthracite recovered, percent |
| Minus 60 x 0 mesh | 74.8 | 9.5 | 72.7 | 10.4 |
| Minus 60 x 140 mesh | 95.0 | 10.1 | 84.8 | 8.8 |
| Minus 140 x 270 mesh | 87.0 | 10.8 | | |

The effectiveness of tests reported in Table 4 is indicated by comparing the data with results from gravity drainage tests in which a slurry made with 60 x 270-mesh anthracite was poured into a 3-inch-diameter pipe 5 feet long, and the water was allowed to drain from the pipe through a glass wool plug at the bottom end. After a drainage period of 6 hours, the anthracite still contained 30.7 percent water.

The arrangement of fan and solids collection equipment may be varied within the scope of this invention. For instance, the fan may be used to force gas from the bottom of the chamber. The shape of separation chamber is preferably conical; however, cylindrical or polygonal chambers may be used.

This process, by providing a mechanical method for separating the phases of a slurry, offers benefit to many dewatering operations. The method also allows the separation of liquid from solid particles without significant effects from evaporation and the accompanying high costs of supplying latent heat of evaporation, as has been shown by using air having a high relative humidity as the separation gas.

The invention has been illustrated by specific examples but there is no intent to limit the invention to the specific details so disclosed, except insofar as set out in the following claims.

What is claimed is:
1. A process for separating a liquid solid mixture comprising the steps of:
   (a) introducing a controlled updraft of an ambient gas stream within a chamber;
   (b) introducing into the ambient gas stream a finely divided stream of a mixture of coal particles in liquid;
   (c) maintaining the gas stream at the point of introduction of said mixture therewith at a flow rate of between 35 to 120 feet per minute and temperature sufficient to selectively and substantially separate the liquid from the coal particles and entrain, in the form of liquid particles, substantially all the liquid portion of said liquid-solid mixture without any significant evaporation of the liquid particles;
   (d) removing from said chamber the liquid particles entrained in the gas;
   (e) allowing the solid particles to gravitate to a collection zone; and
   (f) removing said solid particles.
2. The process of claim 1 wherein the liquid-solid mixture consists essentially of coal and water.
3. The process of claim 1 wherein the flow of said gas stream and said stream of finely divided liquid-solid mixture are countercurrent.
4. The process of claim 3 wherein the liquid-solid mixture consists essentially of coal and water.

References Cited by the Examiner

UNITED STATES PATENTS

| | | | |
|---|---|---|---|
| 1,601,897 | 10/1926 | Wiley et al. | 159—4 |
| 1,732,454 | 10/1929 | Wurster | 159—4 |
| 1,770,120 | 7/1930 | Ames et al. | 159—4 |
| 1,786,080 | 12/1930 | Newhouse | 159—4 |
| 1,837,869 | 12/1931 | Jewett et al. | 159—4 |
| 1,932,467 | 10/1933 | Keenan | 159—9 |
| 2,054,441 | 9/1936 | Peebles | 159—4 |
| 2,118,803 | 5/1938 | Bowen | 159—4 |
| 3,036,627 | 5/1962 | Scharman | 159—4 |
| 3,074,856 | 1/1963 | Meliss | 196—14.5 |
| 3,229,748 | 1/1966 | Holmer | 158—109 |

NORMAN YUDKOFF, *Primary Examiner.*

J. SOFER, *Assistant Examiner.*